Jan. 17, 1950     E. B. ANKENMAN     2,495,155
HIGH-FREQUENCY STABILIZED ARC WELDING SYSTEM
Filed July 24, 1948
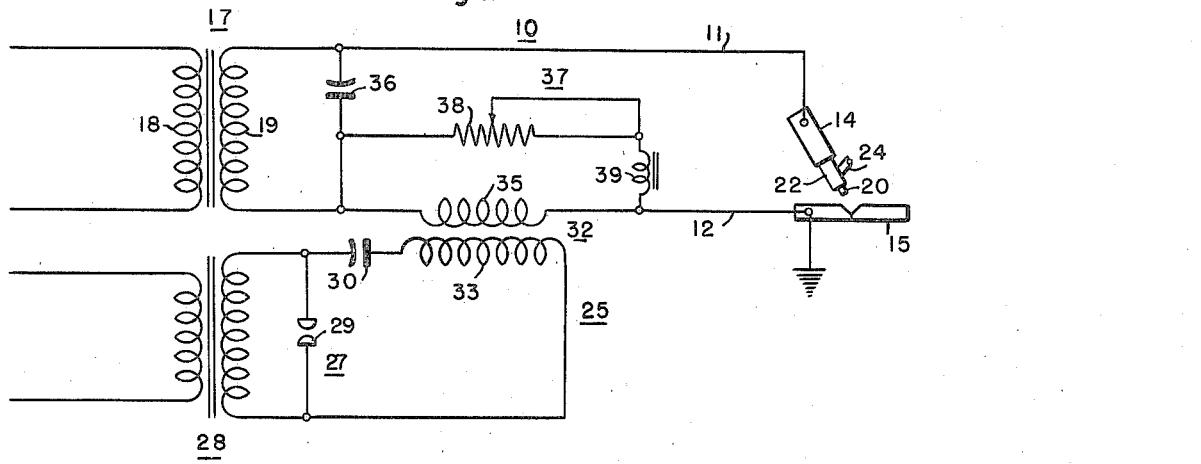
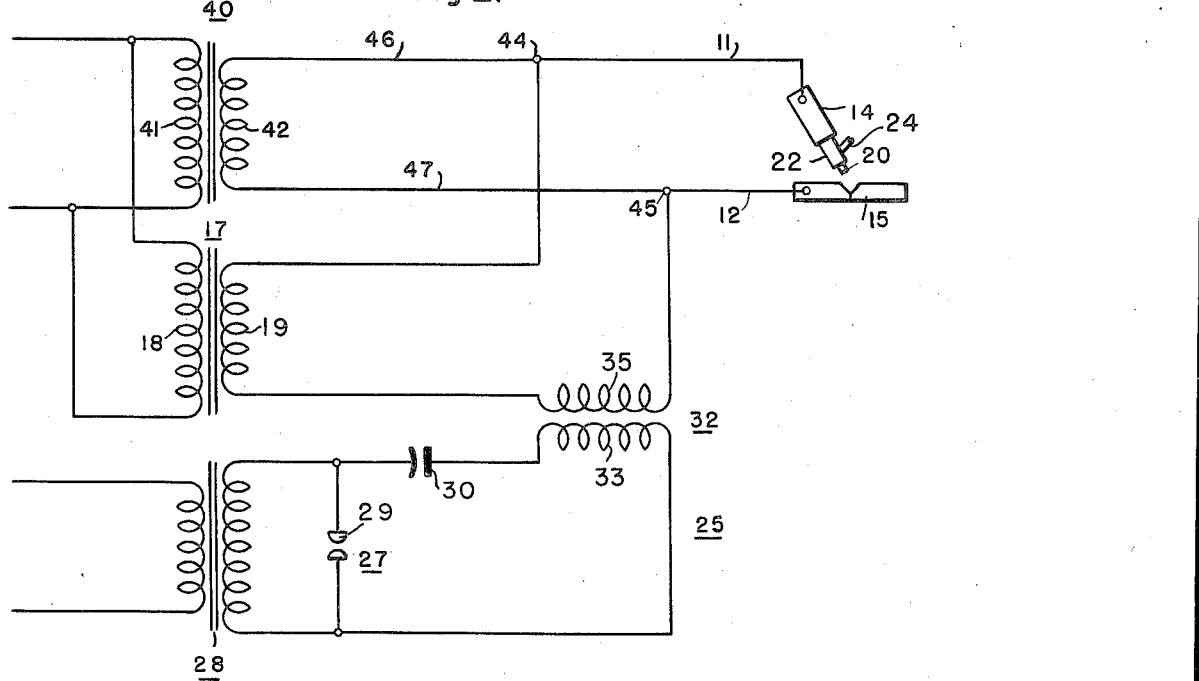
INVENTOR
Earl B. Ankenman.

Patented Jan. 17, 1950

2,495,155

UNITED STATES PATENT OFFICE 2,495,155

HIGH-FREQUENCY STABILIZED ARC
WELDING SYSTEM

Earl B. Ankenman, Cincinnati, Ohio, assignor to
Westinghouse Electric Corporation, East Pittsburgh, Pa., a corporation of Pennsylvania Application July 24, 1948, Serial No. 40,592

8 Claims. (Cl. 315—176)

My invention relates generally to arc welding, and it has reference in particular to high frequency stabilized arc welding systems.

Generally stated, it is an object of my invention to provide a high frequency stabilized arc welding system which is simple and inexpensive to manufacture, and is reliable and efficient in operation.

More specifically it is an object of my invention to provide an improved method of utilizing high frequency arc stabilizing circuits with alternating current arc welding apparatus.

One object of my invention is to provide, in alternating current arc welding apparatus, for increasing the effective capacity of high frequency arc stabilizing equipment so as to enable it to be used with welding apparatus having a higher current rating.

Another object of my invention is to provide for utilizing an inductive shunt in conjunction with the coupling unit of high frequency arc stabilizing apparatus for increasing the effective welding current capacity of the apparatus without decreasing its arc stabilizing characteristics.

Yet another object of my invention is to provide, in alternating current arc welding apparatus, for increasing the effective welding current capacity of a high frequency arc stabilizing device by utilizing it in circuit relation with one transformer supplyng welding current to a welding circuit, and connecting another welding transformer in parallel circuit relation with said one transformer.

Other objects will in part be obvious, and will in part be explained hereinafter.

In accordance with one embodiment of my invention the effective welding current capacity of a series coupled high frequency arc stabilizing unit is increased by connecting a shunt around the coupling coil in the welding circuit so as to by-pass a portion of the total welding current. An inductance device connected in circuit relation with the shunt prevents the high frequency voltage from being shorted through the shunt.

For a more complete understanding of the nature, objects and scope of my invention reference may be made to the following detailed description, which may be read in connection with the accompanying drawing in which:

Figure 1 is a diagrammatic view of an alternating current arc welding system embodying the invention in one of its forms, and Fig. 2 is a diagrammatic view of an arc welding system embodying the invention in another of its forms.

Referring to Fig. 1, the reference numeral 10 may denote, generally, an arc welding system wherein an arc welding circuit including conductors or leads 11 and 12, which may be connected respectively to an electrode holder 14 and work 15 upon which a welding operation is to be performed, may be supplied with welding current from an arc welding transformer 17 having a primary winding 18 disposed to be connected to a suitable source of alternating current and a secondary winding 19 to which the arc welding circuit may be connected.

The electrode holder 14 may be of any suitable type well known in the art, and for purposes of illustration, it is shown as comprising a non-consumable arcing electrode 20 of tungsten or the like to which the conductor 11 may be electrically connected. The electrode 20 may be surrounded by a hollow nozzle 22 through which a suitable gaseous atmosphere may be supplied for shielding an arc drawn between the electrode 20 and the work 15 which may, for example, comprise a body of aluminum or the like. A suitable gas, such as, for example, helium may be supplied to the nozzle 22 from a source (not shown) through an inlet connection 24 for enveloping or shielding the arc.

In order to provide for stabilizing an arc which may be struck between the electrode 20 and the work 15, stabilizing means 25 may be utilized for impressing a high frequency stabilizing voltage between the electrode 20 and the work 15. The stabilizing means 25 may comprise a high frequency generator 27 including a high voltage transformer 28 which may be energized from the same alternating current source as the transformer 17, a spark gap 29, a capacitor 30 and a coupling transformer 32 having a primary winding 33 disposed to be connected in circuit relation with the capacitor 30 across the spark gap 29 and a secondary winding 35 which may be connected in series circuit relation with the conductor 12 and the secondary winding 19 of the welding transformer. A by-pass capacitor 36 may be connected across the secondary winding 19 to provide a relatively low impedance path for the high frequency output of the stabilizing means 25.

In order to provide for utilizing the stabilizing means 25 with welding transformers of various current capacities, shunt means indicated generally by the numeral 37 may be utilized in conjunction with the secondary winding 35 of the coupling transformer 32 for by-passing a portion of the welding current around the secondary winding 35. The shunt means 37 may, for example, comprise a variable impedance device such as the adjustable resistor 38, and a suitable inductance device such as the choke coil 39, which may be connected in series circuit relation with the resistor 38 to provide a relatively high impedance path thereby preventing any short circuiting of the high frequency voltage produced by the generator 27.

In operation, the adjustable resistor 38 may be so adjusted that the secondary winding 35 is required to conduct no more than its rated value of welding current. The resistor 38 will then conduct the difference between the rated capacity of the winding 35 and the desired value of welding current. The coupling transformer 32 may thereby be effectively used with welding transformers of various ratings in excess of the rated capacity of the coupling transformer. While the adjustable resistor 38 readily conducts the relatively low frequency welding current, the choke coil 39 blocks the flow of the high frequency stabilizing current through the shunt circuit, so that the full value of the stabilizing voltage is made available at the arc between the electrode 20 and the work 15 for efficiently stabilizing and maintaining the arc.

Referring to Fig. 2 it will be seen that an arc welding transformer 17 is again employed for supplying current to an arc welding circuit including conductors 11 and 12 which may be connected respectively to an electrode holder 14 and work 15 upon which a welding operation is to be performed. Arc stabilizing means 25 comprising a high frequency generator 27 including a high voltage transformer 28 and a coupling transformer 32 may, as hereinbefore described, be utilized in conjunction with the arc welding transformer 17 for supplying a high frequency stabilizing voltage between the electrode 20 and the work 15.

In order to provide for utilizing the stabilizing means 25 without overloading the current carrying capacity of the coupling transformer 32 when a value of welding current in excess of the rated capacity of the coupling transformer is to be used, an additional welding transformer 40 may be provided, having a primary winding 41 which may be connected to the same source of alternating current as a primary winding 18 of the transformer 17. The secondary winding 42 of the additional transformer 40 may be connected to supply current to the welding circuit independently of the coupling transformer 32 being, for example, connected to the conductors 11 and 12 at junction points 44 and 45 by conductors 46 and 47 respectively.

In operation, both of the welding transformers 17 and 40 supply current to the arc welding circuit. The coupling transformer 32 carries only the welding current supplied by the transformer 17, and is not overloaded by the additional welding current supplied to the welding circuit by the transformer 40. By utilizing in this arrangement welding transformers similar to the additional transformer 40 of different current capacities, the total value of the welding current may be varied over a relatively wide range without exceeding the particular rating of the coupling transformer 32.

From the above description and the accompanying drawing it will be apparent that I have provided in a simple and effective manner for increasing the effective current capacity of high frequency arc stabilizing apparatus so that apparatus of a single rating may be utilized for a relatively wide range of values of welding current. This facilitates standardization of ratings and reduces the number of different ratings of stabilizing apparatus which must be utilized, thereby providing for much less expensive and more flexible welding systems.

Since certain changes may be made in the above described construction, and different embodiments of the invention may be made without departing from the spirit and scope thereof, it is intended that all the matter contained in the above description and shown in the accompanying drawing shall be considered as illustrative and not in a limiting sense.

I claim as my invention:

1. In combination, an arc welding circuit, a high frequency arc stabilizer, coupling means connected in the arc welding circuit to couple the stabilizer and the arc welding circuit, and impedance means connected in shunt circuit relation with the coupling means in the arc welding circuit to provide a path for a portion of the arc welding current.

2. An arc welding system comprising, an alternating current arc welding circuit, a high frequency arc stabilizing device, and coupling means so connected in the arc welding circuit as to apply a high frequency arc stabilizing voltage thereto while carrying only a portion of the arc welding current.

3. An arc welding system comprising, an arc welding circuit, a high frequency arc stabilizer, coupling means connecting the high frequency arc stabilizer in circuit relation with the arc welding circuit to apply a stabilizing high frequency voltage thereto, and circuit means connected to supply additional welding current to the arc welding circuit independently of said coupling means.

4. In an arc welding system, an arc welding circuit disposed to be energized from a source of alternating current, a high frequency generator, a coupling transformer having one winding connected in series circuit relation with the arc welding circuit and the source, and another winding connected to the high frequency generator, and impedance means connected in shunt circuit relation with said one winding to provide a by-pass circuit for a portion of the welding currrent.

5. An arc welding system comprising, an arc welding circuit disposed to be energized from a source of alternating current, a high frequency generator, a coupling transformer having a secondary winding connected in the welding circuit and a primary winding connected to be energized from the high frequency generator, and impedance means connected in shunt circuit relation with the secondary winding including an inductance device having a relatively high impedance to a high frequency current.

6. In combination, an arc welding circuit disposed to be energized from a source of alternating current, a high frequency generator, a coupling transformer having a primary winding energized from the high frequency generator and a secondary winding connected in series circuit relation between the arc welding circuit and the source, and circuit means connected to supply alternating current to the arc welding circuit independently of said coupling transformer.

7. Arc welding apparatus comprising, a welding transformer having a primary winding for connection to a source of alternating current and a secondary winding for connection to an arc welding circuit, a high frequency generator, a coupling transformer having a primary winding connected for energization from the high frequency generator and a secondary winding connected in series circuit relation with the secondary winding of the welding transformer, and impedance means connected in shunt circuit relation with the secondary winding of the coupling transformer having a high impedance to the high frequency generator current.

8. In arc welding apparatus, an arc welding transformer having a primary winding disposed to be connected to a relatively low frequency source of alternating current and a secondary winding disposed to be connected to supply current to an arc welding circuit, a high frequency generator disposed to be energized from the low frequency source, a coupling transformer having one winding connected to the high frequency generator and another winding disposed for connection between the secondary winding and the arc welding circuit, and an additional arc welding transformer having a primary winding disposed to be energized from the low frequency source and a secondary winding disposed to be connected to the arc welding circuit in parallel circuit relation with the secondary winding of the first-mentioned welding transformer intermediate said another winding of the coupling transformer and the arc welding circuit.

EARL B. ANKENMAN.

REFERENCES CITED

The following references are of record in the file of this patent:

UNITED STATES PATENTS

| Number | Name | Date |
|---|---|---|
| 2,310,015 | Agnew | Feb. 2, 1943 |
| 2,395,062 | Nielsen | Feb. 19, 1946 |
| 2,399,377 | Pakala et al. | Apr. 30, 1946 |